United States Patent [19]

Akimoto

[11] Patent Number: 5,415,251
[45] Date of Patent: May 16, 1995

[54] MAGNETIC CONVEYOR

[76] Inventor: Sadahiko Akimoto, 3906 Collis Ave., Los Angeles, Calif. 90032

[21] Appl. No.: 95,249

[22] Filed: Jul. 22, 1993

[51] Int. Cl.⁶ .............................................. B65G 35/00
[52] U.S. Cl. ...................................... 186/49; 198/619
[58] Field of Search ............................ 186/45, 46, 49; 198/619

[56] References Cited
U.S. PATENT DOCUMENTS

| | | | |
|---|---|---|---|
| 2,824,638 | 2/1958 | De Burgh | 198/619 |
| 3,474,892 | 10/1969 | Spodig | 198/619 |
| 3,610,161 | 10/1971 | Wishart et al. | 198/619 X |
| 3,882,791 | 5/1975 | Youngscap | 198/619 X |
| 4,518,078 | 5/1985 | Garrett | 198/619 X |
| 4,540,326 | 9/1985 | Southworth et al. | 198/619 X |
| 4,624,617 | 11/1986 | Belna | 198/619 X |

Primary Examiner—F. J. Bartuska
Attorney, Agent, or Firm—John B. Dickman, III

[57] ABSTRACT

A sushi restaurant sushi counter having a magnetic conveying system for transporting sushi plates around the counter to different positions.

5 Claims, 4 Drawing Sheets

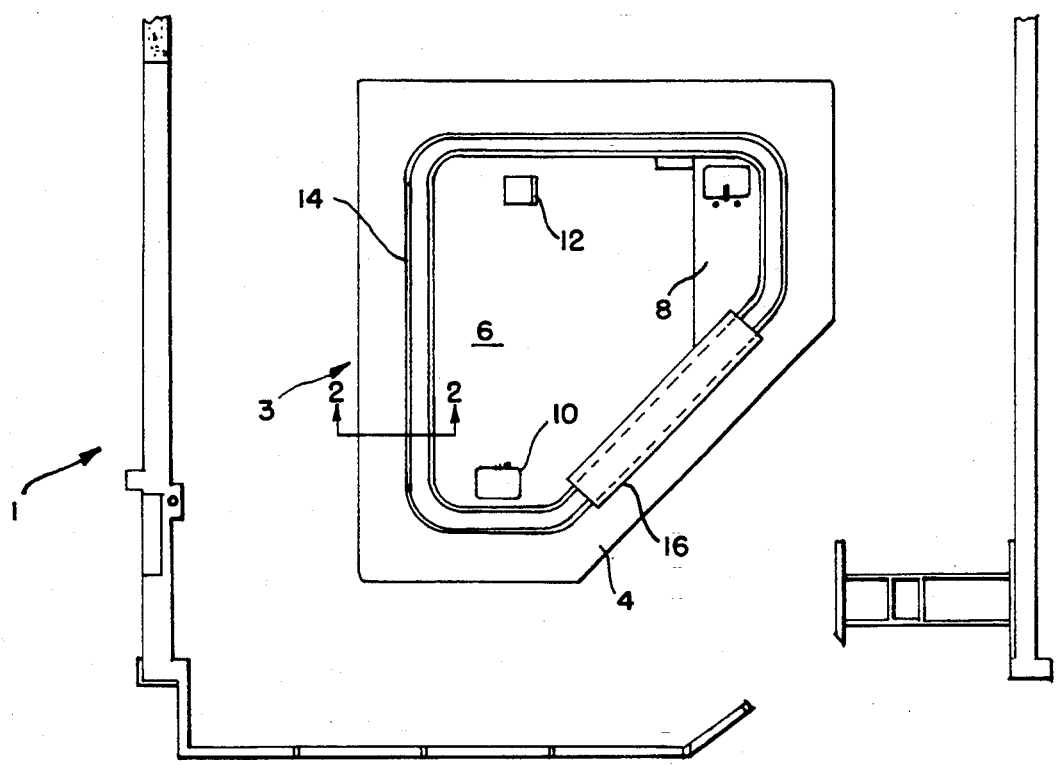
FIG.1
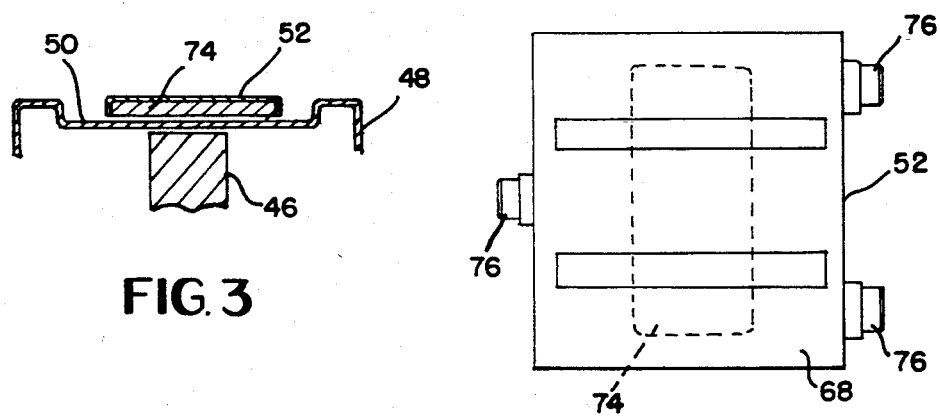
FIG.3
FIG.7
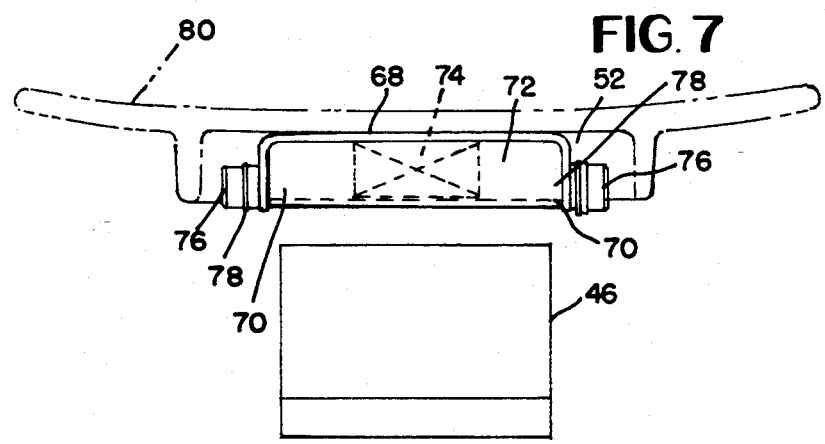
FIG.8

MAGNETIC CONVEYOR

BACKGROUND OF THE INVENTION

Restaurants with counter service, such as sushi restaurants, are a beehive of activity with counter people hustling about. There may be as many as three or four people behind an average counter, and more in a large restaurant. Sushi restaurants, because of their specialized menu, serve as many as six different types of fish per customer. Generally, one sushi chef moves along a counter selecting the different fish, and with several chefs doing the same thing there is a lot of lost motion. If each chef could remain in one place and have the fish delivered to him there would be less confusion.

One possible solution is found in U.S. Pat. No. 3,610,161, issued to Wishart, where a conveyor system delivers food from a kitchen area to an eating area and returns dishes from the eating area to the kitchen area. A magnetic conveyer which includes a plurality of dollies that travel a prescribed path and a similar number of serving dishes magnetically connected to the dollies is shown in the present invention. Each dolly has its own drive means and is programmed to travel a particular course. Separating the dollies from the dishes is a non-magnetic surface.

The use of conveyors to transport food in a restaurant is well known, however, magnetic conveyors to transport food are less known. The Wishart patent is a good example of a magnetic food transport. Magnetic conveyors for other purposes are shown in U.S. Pat. No. 3,882,791, issued to Youngscap, U.S. Pat. No. 4,518,078, issued to Garrett, and U.S. Pat. No. 4,624,617, issued to Belna.

The Youngscap patent is both a magnetic and fluid energy transmission system. Ferromagnetic slugs spaced in a pipe line are magnetically coupled to carriers traveling on the exterior of the pipe line. A fluid pumped through the pipe line moves the slugs.

A wafer transport system is disclosed in Garret patent where an exterior magnetic device moves an interior magnetic device connected to a wafer support. The magnetic coupling allows the wafer support to move wafers in and out of a sputtering zone.

Another wafer transport system is disclosed in Belas where a car is levitated and propelled along a track using magnetic forces.

SUMMARY OF THE INVENTION

The present invention is directed to a magnetic transport system for moving food, and in particular a magnetic transport system employing a driven magnet magnetically coupled to a magnetic carriage.

Briefly, the present invention provides a delivery system extending around a restaurant counter. The delivery system is built into the counter with magnets mounted on a driven chain traveling in a hollow pathway. These carriages include permanent magnets or equivalent magnetic materials. A sprocket driven by a motor drive chain with the magnets moving through the hollow pathway is shown. Spaced along the chain on pedestals are the magnets positioned so that the magnets are just below the non-magnetic tracking to couple with the carriage. As the carriages move along the tracking, sushi chefs prepare plates of sushi by selecting food from each carriage.

BRIEF DESCRIPTION OF THE DRAWINGS

FIG. 1 is a top plan view of a sushi bar with a magnetic conveyor of the invention.

FIG. 3 is a cross section of a trackway and carriage of the invention.

FIG. 7 is a top plan view of a carriage of the invention.

FIG. 8 is a front plan view of a carriage of the invention.

DESCRIPTION OF THE INVENTION

Figure 2:
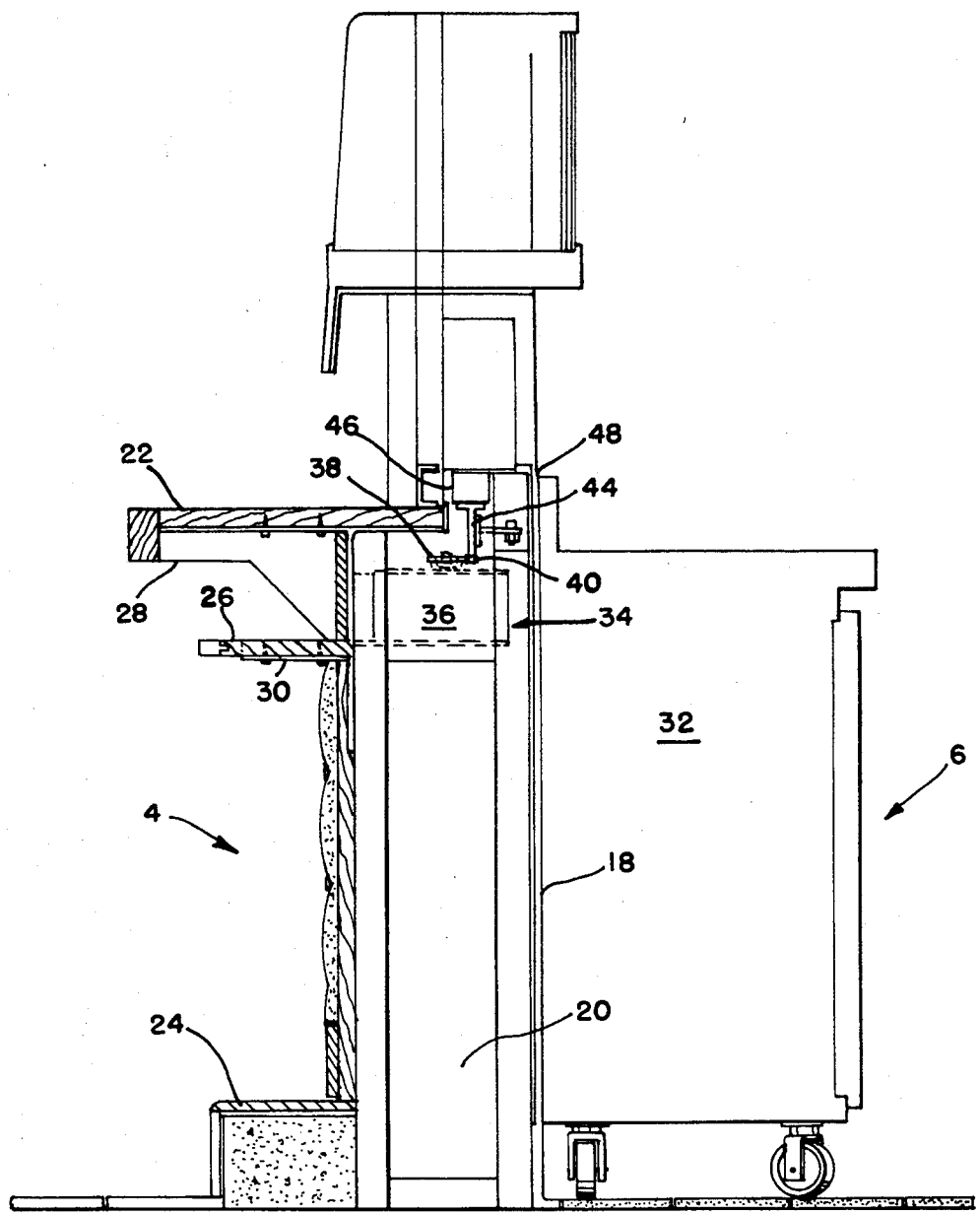
FIG. 2 is a cross section of a counter with the magnetic conveyor taken along the line 2—2 of FIG. 1.

Referring to the drawings there is shown in FIG. 1 a sushi restaurant 1 with a sushi bar 3. The sushi bar 3 has a counter 4 which surrounds a work pit 6. Sushi chefs work in the works pit 6 preparing orders for customers seated at the counter 4. Also present in the work pit 6 is bar 8 for preparing drinks, a refrigerator 10 and a sink 12. There are the usual food and beverage areas, rest rooms, etc. which are not shown.

The counter 4 of the present invention has a transport system 14 for conveying prepared orders around the sushi bar to the appropriate customer, or from one work station to the next where different parts of the order are assembled. The transport system 14 is a magnetic conveyor driven by a roller chain conveyer, which will be explained in detail. FIG. 1 shows the transport system 14 and a show case 16 mounted above the transport system.

In FIG. 2, a cross-section of the counter 4 is shown with a vertical support 18 that has a hollow section 20, and a horizontal eating or servicing counter top 22 which projects from the vertical support 18. Also on the customer side of counter 4 is a foot rest 24 and a small shelf 26. Counter tops 22 and shelf 26 are supported on braces 28 and 30, respectively. Behind the counter 4 is the work pit area 6 where a food storage unit 32 may be found.

Within the hollow space 20 is a roller chain conveyor system 34 of the invention. Roller chain conveyor 34 has an electric drive motor 36 to turn a sprocket gear 38. An endless roller chain engages the teeth 42 of the sprocket gear 38 to pay the roller chain 40 through the hollow space 20. Fixed to the roller chain 40 are pedestals 44 with permanent magnets 46 extending from their free ends. The permanent magnets 46 travel a course prescribed by the roller chain conveyor system 34 which moves the magnets 46 through a non-magnetic stainless steel channel 48. The top surface of channel 48 has a track 50 in which carriage 52 travels, FIG. 3. The carriage 52 will be explained later.

Figure 5:
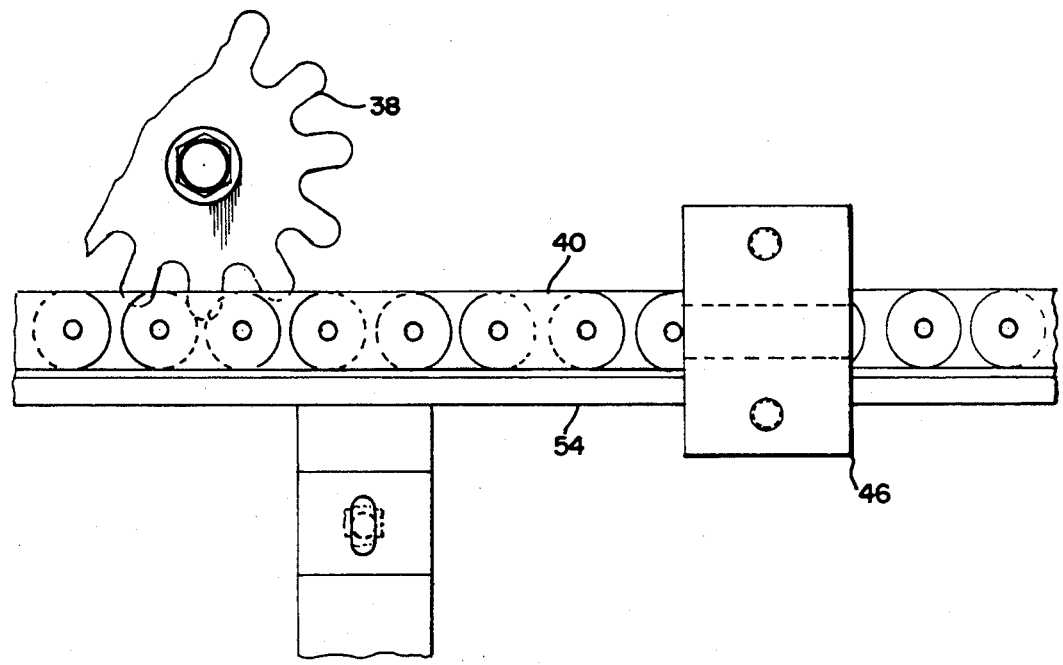
FIG. 5 is a top plan view of a conveying system of the invention.
Figure 6:
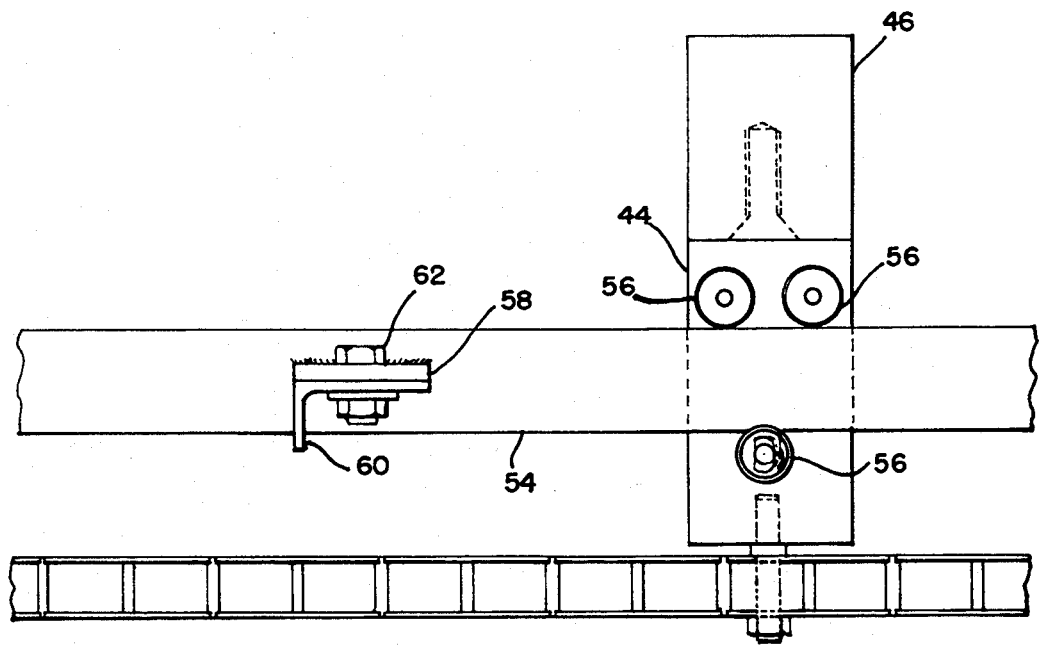
FIG. 6 is a side view taken along the line 6—6 of FIG. 5 showing a conveying system of the invention.

FIGS. 5–7 show a roller chain 40 engaging a sprocket gear 38. Above the roller chain 40 is a steel railing 54 for supporting and guiding the roller chain 40 and the pedestals 44. A side view of the roller chain 40 and railing 54, FIG. 6, also shows a pedestal 44 and guide rollers 56. Railing 54 is secured to the counter 4 by a support 56 which includes a member 58 welded to the railing 54 and a second member 60 fixed to the vertical support 18 of the counter, see FIG. 7. Members 58 and 60 are held together by a bolt 62.

Pedestals 44 have guide roller supports 64 on which guide rollers 56 freely roll. There are three guide rollers 56 per pedestal, arranged to support and guide the pedestals and the roller chain. The pedestals 44 are connected to the roller chain 44 by bolts 66 threaded into the pedestals.

A carriage 52 is shown in FIGS. 7 and 8. The carriage 52 has a flat surface 68 and side walls 70. Potted in a cavity 72 is a permanent magnet 74 which couples to magnet 46 on the pedestals 44. Each carriage 52 has teflon plastic wheels 76 for moving the carriage silently along track 50. Polyethylene tires 78 further quiet the carriage. FIG. 8 shows a plate 80 for resting on the carriage.

Looking closely at the magnetic transport system 14, driven sprocket gear 38 engages endless roller chain 40 to move it at a slow speed through counter hollow space 20. A plurality of pedestals 44 on the roller chain 40 carry permanent magnets 46 close to the non-magnetic channel 40. Moveable on a track 50 in channel 48 are carriages 52. These carriages 52 have magnets which couple to magnets 46 for transport.

Carriages 52 lift off the stainless steel channel for cleaning. Health regulations require that all areas in and around food preparations and serving be kept free of bacteria and germs. The carriages 52 are easily removed for cleaning, along with the channel 48, by breaking the magnetic forces between magnets 46 and 74. So that the carriages 52 move friction free on channel 48 a food grade silicone spray coats the surface between the carriages and the channel.

Figure 9:
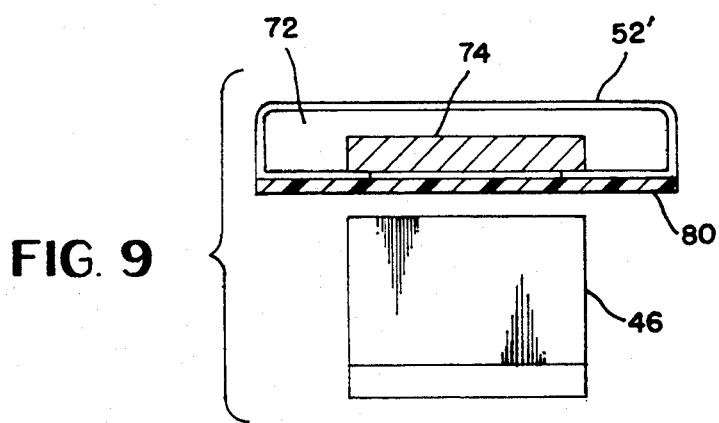
FIG. 9 shows another embodiment.
Figure 4:
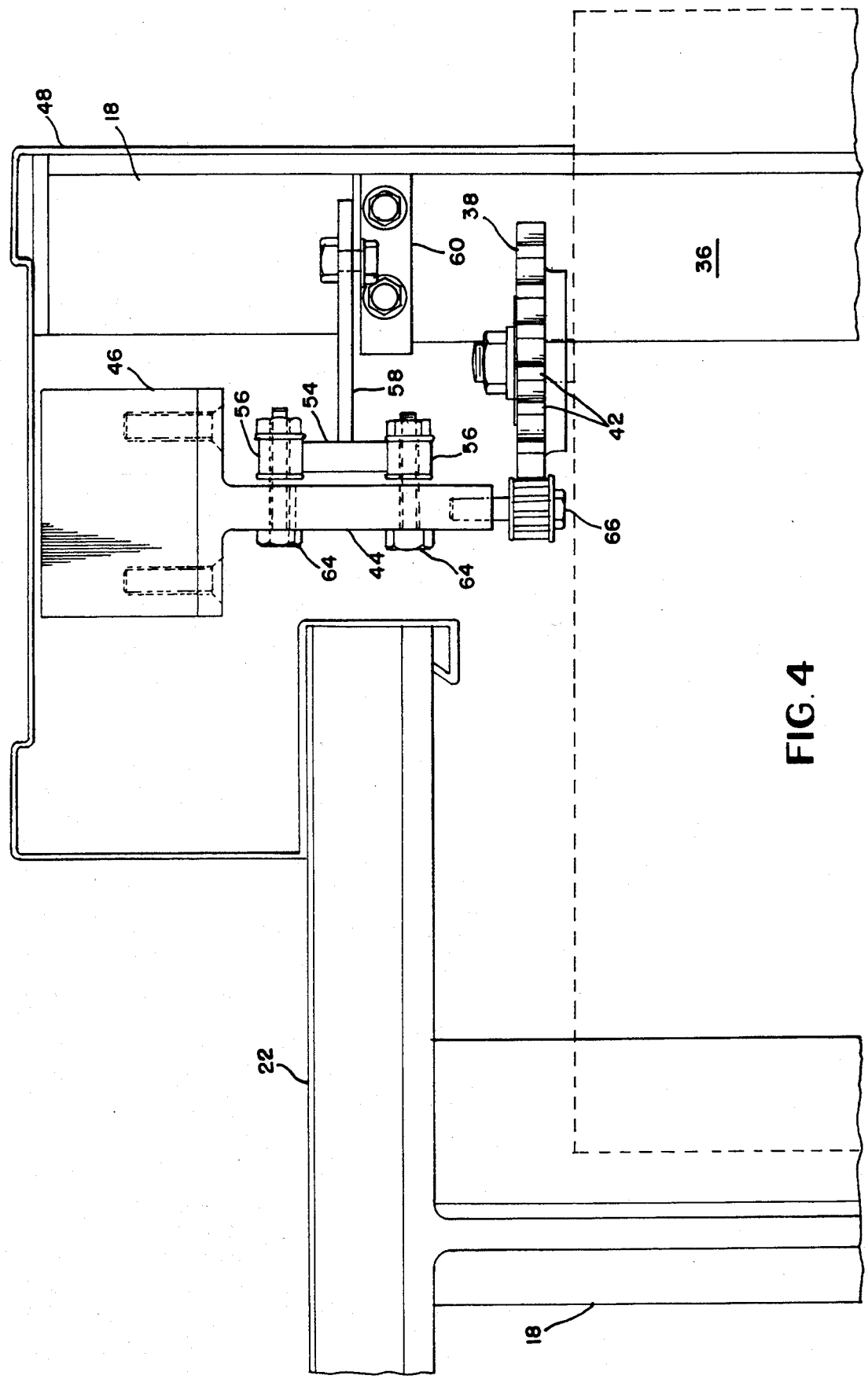
FIG. 4 is a cross section of the counter and magnetic transport showing details of a conveying system of the invention.

In another embodiment, FIG. 9, wheels 76 have been removed and a mylar film 80 is bonded to the bottom surface of carriage 52. The mylar film 80 permits the carriage 52 to slide smoothly on the track 50. Replacing wheels 76 with a mylar film 80 can in certain situations eliminate or at least reduce noise from the wheels, and the need to clean and lubricate them.

Even though the transport system 14 is directed to a sushi bar, there are several applications in the food industry where the transport system would be a benefit. For instance, a frozen food production line where a food is cooked at one station, which includes a sanitation chamber, and then subjected to a quick freezing chamber. The entire operation takes place within a span of fifteen feet, which create enormous maintenance problems on a conveying system. The present transport system has been successfully demonstrated in the production of frozen cooked shrimp, eliminating the problems associated with mechanical conveyors which have more break-downs and more cleaning and lubricating problems.

I claim:

1. A transport system for a restaurant counter, comprising:

a first conveying means built in a counter with means for conveying continuously, a second conveying means having a magnetic coupling for transporting objects, said first conveying means having a first magnetic means affixed to said first conveying means for travel, and said second conveying means having a second magnetic means separated from said first magnetic means by a non-magnetic track surface for magnetic attraction between said first and second magnetic means, to move said second conveying means on said non-magnetic track surface, a plurality of pedestal means on said first conveyor means carrying said first magnetic means, a guide railing means for supporting and guiding said first conveying means and said pedestal means, said guide railing means is mounted in said counter to suitably position said first magnetic means to attract said second magnetic means, guide roller means on said pedestal engage said guide railing means for reduced friction travel.

2. A transport system as in claim 1 wherein said roller chain means and a sprocket gear means are driven by a brushless electric motor.

3. A transport system as in claim 2 wherein said second conveying means having wheel means to travel on said non-magnetic track means.

4. A transport system as in claim 4 wherein said second conveying means having friction reducing means to travel on said non-magnetic track means.

5. A transport system as in claim 4 wherein said friction reducing means is a mylar sheet.

* * * * *